United States Patent [19]

Faust et al.

[11] Patent Number: 5,280,370
[45] Date of Patent: Jan. 18, 1994

[54] APPARATUS AND METHOD FOR SCANNING BY MEANS OF A ROTATABLE DETECTOR ARRAY

[75] Inventors: Hans W. Faust, Heidenheim; Karl Felle, Oberkochen; Dierk Hobbie, Königsloroun; Heinz Krastel, Oberkochen, all of Fed. Rep. of Germany; Richard J. Kaiser; Robert L. Kuelthau, both of Huntsville, Ala.; Alward J. Pinard, Westford, Mass.; Gary D. Wylie, Harvest, Ala.

[73] Assignee: Intergraph Corporation, Huntsville, Ala.

[21] Appl. No.: 577,865

[22] Filed: Sep. 5, 1990

[30] Foreign Application Priority Data

Sep. 11, 1989 [DE] Fed. Rep. of Germany ....... 3930290

[51] Int. Cl.$^5$ .............................................. H04N 1/04
[52] U.S. Cl. ...................... 358/488; 382/45; 358/497
[58] Field of Search .............. 358/488, 471, 497, 498, 358/488; 382/45, 46; H04N 1/04, 1/10, 1/387

[56] References Cited

U.S. PATENT DOCUMENTS

| 4,393,410 | 7/1983 | Ridge et al. | 358/488 |
| 4,424,535 | 1/1984 | Rothbart et al. | 358/498 |
| 4,506,301 | 3/1985 | Kingsley et al. | 358/462 |
| 4,567,528 | 1/1986 | Wilman et al. | 358/498 |

FOREIGN PATENT DOCUMENTS

| 0123162 | 7/1985 | Japan | 358/488 |
| 0214153 | 10/1985 | Japan | 358/488 |

Primary Examiner—Edward L. Coles, Sr.
Assistant Examiner—Jill Jackson
Attorney, Agent, or Firm—Bromberg & Sunstein

[57] ABSTRACT

An apparatus for capture of image data from an object has a detector array containing at least one detector row, and arrangements for rotating the detector array relative to the object, as well as for moving the object and the detector array relative to one another in a desired direction of scan. A control arrangement causes the detector array to be rotated to a desired orientation with respect to the object based on information in the object and causes the object to be scanned by the detector array in such a way that the detector row is at right angles to the direction of scan. A similar method is also provided.

24 Claims, 3 Drawing Sheets

APPARATUS AND METHOD FOR SCANNING BY MEANS OF A ROTATABLE DETECTOR ARRAY

FIELD OF INVENTION

The present invention relates to methods and apparatus for scanning and digitizing images.

BACKGROUND ART

The digitizing of the scans of objects and pictures produces signals obtained by means of data capture equipment, that is known as a scanner. Digitizing is necessary if a picture is to be stored in a computer and it is desired to process the image. The two-dimensional analog information obtained in a run is analyzed into picture points or pixels, which have a differential grayscale. The application of digitizing to image processing is extensive and has come to embrace CAD, CAE, mapping, advertising, art, simulation, and almost all spheres of chemistry and physics. The requirements thereby placed on equipment are correspondingly high. In seeking an image capture of highest quality, information losses come directly and inevitably to the fore. These losses arise through the necessary splitting up of two-dimensional analog information into individual pixels having a known size and predefined distance from one another, wherein the pixels vary in intensity over an established grayscale. In later image processing in the computer there is undertaken an effort to confine the information losses within tolerable limits by means of mathematical algorithms.

Although today's applied mathematical algorithms bring astonishing results, they cannot regain in the image signal more information than was at hand in the object as scanned. It must therefore be the goal to limit, through an optimal data capture, the need for later image processing. This problem is not new, and it has been worked on for a long time.

From the German Patent 36 30 739 there is known a method in which, during data capture of an image, a shifting of the exposed detector array is effected. This shifting is very small and permits image capture in the unrecorded spaces between the individual detector elements of the detector array. The doubled data cluster that has been thereby obtained in scanning the object permits a better and more precise reconstruction of the analog picture information in the computer. The doubled data cluster, however, certainly increases the processing time for both the data capture and the processing in the computer.

In the same direction are aimed attempts at increasing the number of picture points (pixels) used for data capture. Apart from the technological difficulties in the production of a detector array having many detector elements, there arises a further difficulty, at the least a diminution of the area of a single detector which would normally produce a stronger output, or in any case a longer one.

The scanning of bigger images is achieved in practice through scanning of a number of smaller image portions. These portions must be reintegrated and processed in such a way that the raster scan of the first image is joined to the raster scan of the second image, etc. In order to achieve a uniform raster scan, there must be produced a uniform raster in accordance with image processing methods appropriate to the class of engineering involved by means of mathematical algorithms, at great cost of time. The raster produced in this manner has a deviation in comparison with a real raster of a picture, since interpolation and weighting require computation in the computer. All known methods of digitizing of pictures have not satisfied up to now this geometrical problem in the case of data capture.

A similar problem exists in the case of the analysis in photogrammetry of aerial photos, as it is not always possible to place the picture to be scanned in exactly the same position and orientation on the picture transport without irreparable loss of time. Wholly apart from this there is the serious problem in photogrammetry of processing stereo picture pairs. The individual pictures of such picture pairs are distinguished on technical photography grounds on the basis of so-called "canting," viz., they are tilted slightly toward one another. In order to be able to scan such picture pairs, it is necessary that the raster scans in both pictures be in alignment.

In addition to the geometrical problem in the case of data capture, there exists the problem of correcting variations in sensitivity of the detector elements which arise in production and even variations in the extent of illumination, so that an unequivocal relation between the detector signals and the grayscale of the scanned picture elements is obtained.

This problem is addressed in the case of West German patent 23 53 299 by a known scan apparatus in which during the scanning of a standard background or of a white card there is obtained a sensitivity profile of the detector array. This is stored in digital form and then in operation converted from its digital form into an analog form and utilized for correction of the video information signal. This method is involved and prone to error on account of the double transformation of the sensitivity profile signal.

Further methods of correction are known from U.S. Pat. No. 4,317,134 and German Patent 36 30 739, although these methods are not suited to insure a sufficiently quick and precise correction.

SUMMARY OF THE INVENTION

The present invention provides, a method of data capture by means of a detector array containing at least one detector row, in which an object being scanned and the detector array move relative to one another, as well as an apparatus for carrying out the method.

In a preferred embodiment, the invention provides a method for data capture by means of a detector array having at least one detector row, that enables, with one and the same detector array, the optimal raster scan of the object being scanned.

The method according to the invention has the advantage that, through establishing the scan direction and the corresponding angular position of the detector array by information at hand in the object being scanned, the raster scan is determined by criteria that are objective and always reproducible. Through this approach it is insured that the raster scan is largely independent of the position on the apparatus of the object being scanned during the data capture. This is especially advantageous in the data capture of a series of pictures, since the same scan direction can be selected for all individual pictures, so that the succession of picture points (pixels) always possesses the same alignment. This makes a later alignment through the computer by means of mathematical algorithms unnecessary, so that the accuracy of the scan signals determines directly the accuracy of the scan.

This fact is of special advantage for the analysis in photogrammetry of stereo picture pairs, as the raster scan in both pictures can be selected with equal exactness independently of the canting, so that the picture signal can be analyzed directly and without the necessity of a conversion.

In the method of scanning in accordance with the invention the relative movement between object and detector array can be effected continuously or discontinuously, corresponding to the actual task and the actual configuration of the detector array.

The data capture can work in the case of flat objects either in reflected light or (for transparent objects) in transmitted light. A data capture in transmitted light is especially advantageous in the case of the analysis in photogrammetry of aerial photos, as the developed film can be used directly. This guarantees the optimal capture of the information content of the picture.

Information contained in the object being scanned can serve in the establishment of the scan direction and thus the raster scan. For instance, in the analysis of aerial photos there are so-called "landmarks," viz., marked points on terrain. These marks appear in aerial photos and are used then as reference points for later analysis of the pictures. Before the actual data capture, the aerial photo is scoured for these reference points. These are known beforehand to be found in specific picture segments, so the search of the picture can be limited to these segments. After the reference points are found through mathematical algorithms or through an interactive work session with the user, there is obtained from their picture coordinates the orientation for the rotation of the detector array and for the establishment of the direction of scan. In the case of any interactive work session, these reference points can be determined and established by working either on the basis of a coarse overview scan of the entire picture or, e.g., with the help of a separate print of the picture being scanned.

In a further embodiment of a method in accordance with the present invention, scanning is achieved by movement of the object in two coordinate directions perpendicular to one another. Through this combined movement there results the scan in the previously determined scan direction, with respect to which the fixed detector array is so rotated that its detector row lies perpendicular to the scan direction.

Calibration of the detector array benefits the capture of data, and in a preferred embodiment may be done on a repetitive basis, after the scanning of n swaths of the picture. In this connection, it is advantageous that the calibration be obtained using a calibration field having a defined grayscale located outside of the object being scanned, and the data pertaining to this field are stored in the memory of a computer. In calibration of the detector array, it is directed over a calibration field, which displays at least two stripes with a defined grayscale. The resulting detector signals are converted into digital signals and corrected to corresponding values. The ordered correction factors for the single detector elements are stored in the computer. In connection with a proper scan run, the resultant analog picture signals are converted into digital signals and after this corrected with the digital correction factors in storage using digital computation.

In accordance with a preferred embodiment of the apparatus of the invention, the photographic picture, for example, the aerial photograph, constituting the object to be scanned is arranged on a picture transport which is moved by means of at least two computer-controlled drive motors along a predetermined scan direction. The detector array itself is rotationally oriented so that it can be brought into the desired position. The rotation is achieved preferably under computer control by a separate motor.

In order to insure an exact movement of the picture transport relative to the fixed detector array, it is advantageous to add on a servo loop employing sensed position feedback. In this connection, the signal indicative of the picture transport (used for sensed position feedback) is used to provide synchronization of data collection from the detector array.

The calibration fields for calibration of the detector array are appropriately arranged outside of the picture field. It is advantageous for the light source to be arranged with an interchangeable filter, e.g., for the digitizing of colored pictures.

BRIEF DESCRIPTION OF THE DRAWINGS

The invention is more particularly described in the following detailed description of the drawings represented in FIGS. 1-3. In this connection, there are shown in particular.

DETAILED DESCRIPTION OF SPECIFIC EMBODIMENTS

Figure 1:
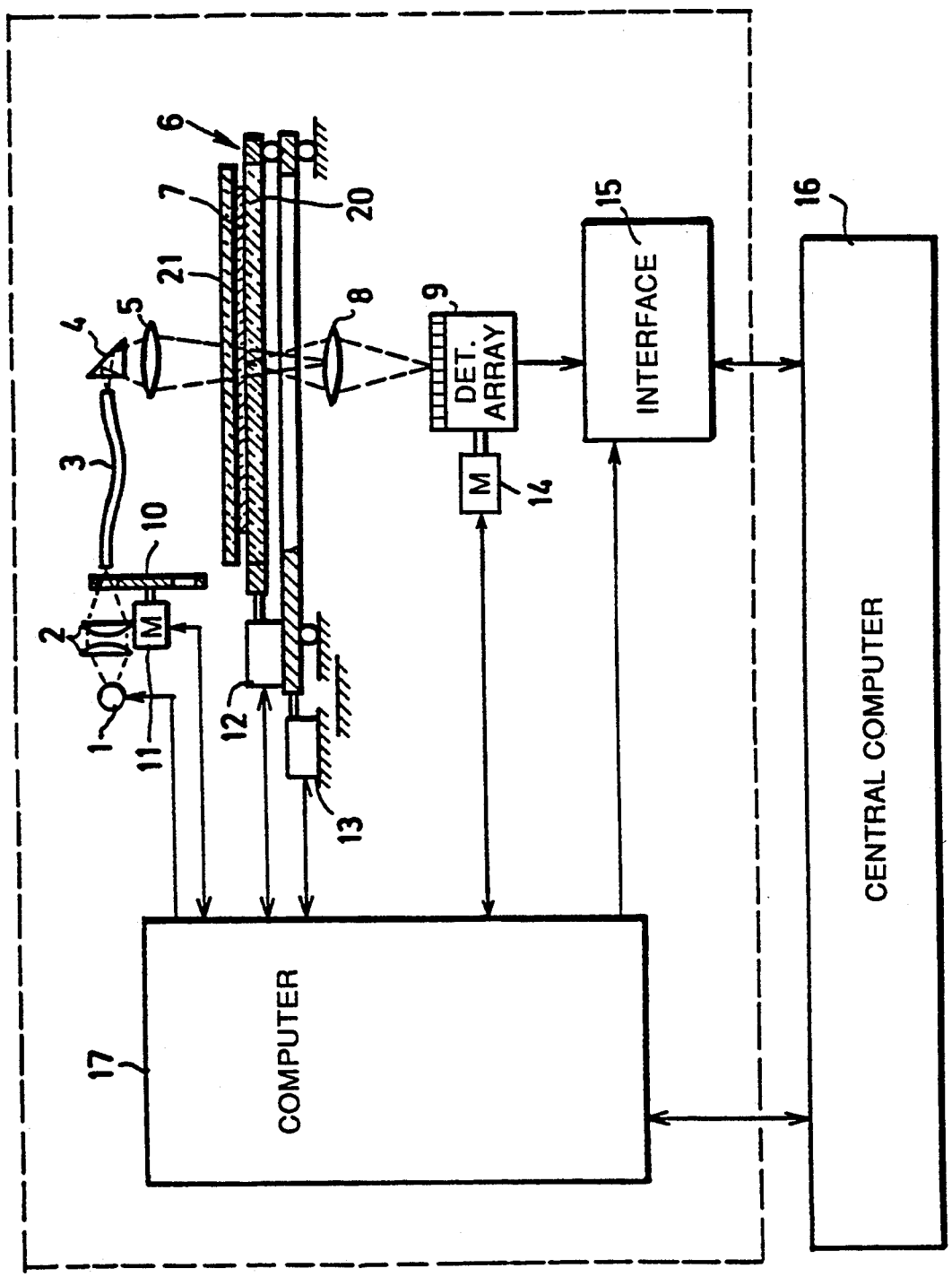
FIG. 1, a schematic representation of an exemplary embodiment of an apparatus according to the invention.

There is marked as item 1 a light source, which is imaged by means of an optical system 2 at the light entrance plane of a fiber optic bundle 3. After the exit from this fiber optic bundle, the light is, by means of a prism 4, reflected, and illuminates, via a lens 5, a preselected area of the object 7 arranged on the picture transport 6. This object can be, in the example shown, an aerial photo transparency. By means of an optical system 8, the illuminated area of the picture 7 is imaged on a detector array 9, which in the example represented can be a linear array. Between the optical system 2 and the fiber optic bundle 3 is arranged a filter wheel 10, which contains several light filters which can be color or attenuating filters, or a combination thereof. The filter wheel 10 is moved into a pre-selected position by means of a motor 11.

The picture transport 6 is, by means of two motors 12 and 13, moveable along two fixed coordinate directions perpendicular to one another. A further motor 14 serves to rotate the detector array 9 into a pre-selected angular position.

The detector array 9 produces electrical signals whose magnitude depends on the intensity of the light transmitted through the picture 7. The signals produced by the array 9 proceed to an interface 15. From there they are led to a central computer 16.

Item 17 identifies a further computer which controls both the light source 1 and the filter wheel 10 in order to establish the optimal illumination of the scanned object.

The computer 17 controls, furthermore, the motors 12 and 13 for the drive of the picture transport as well as the motor 14 for rotation of the detector array 9 into a pre-selected position. In addition, the computer 17 utilizes the signal pulses indicative of the position of the picture transport (used for sensed position feedback) to calculate and output a clock signal to the detector array to trigger data collection.

The picture 7 to be scanned lies, during data capture, on the flat transparent surface 20 of the picture transport 6. Item 21 is a transparent cover, which presses the picture firmly onto the support surface 20, so as to assure during data capture the flattest possible surface of the picture.

Figure 2:
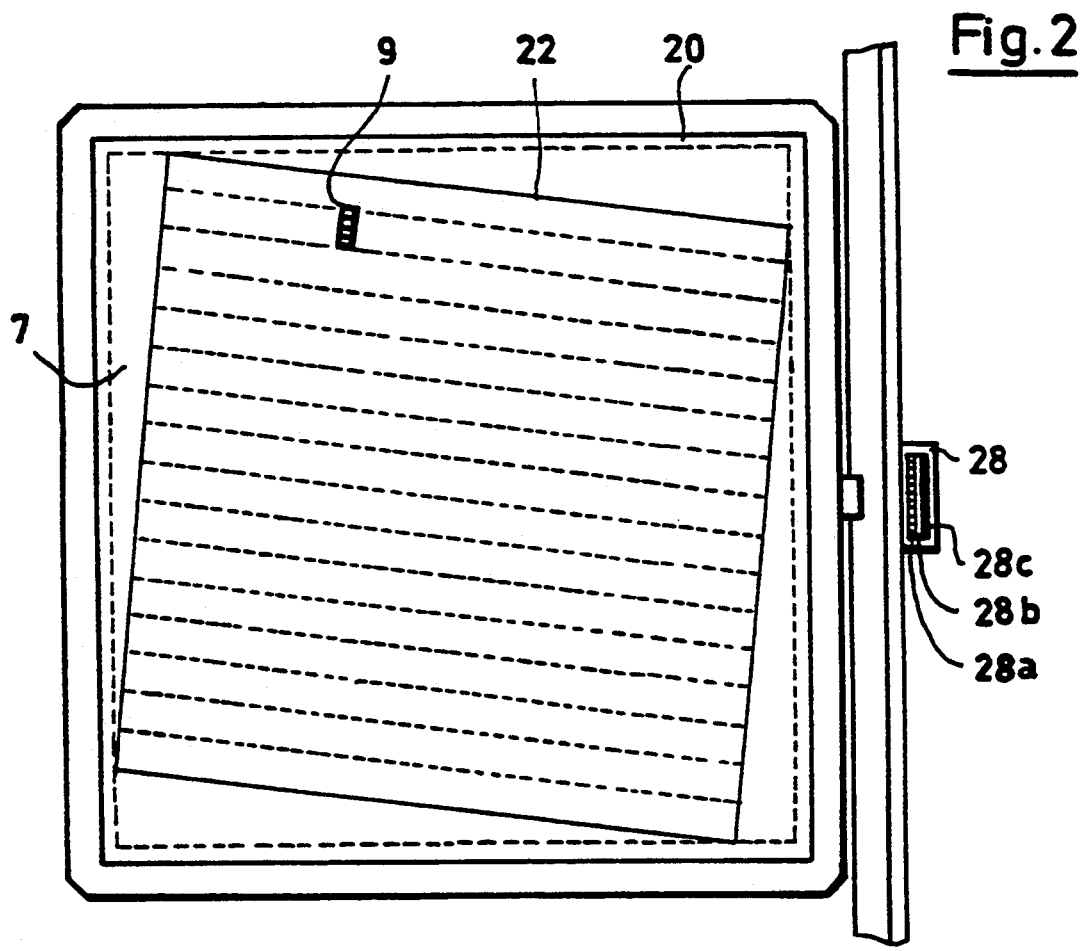
FIG. 2, a view of the picture plane of the picture transport of the apparatus according to FIG. 1.

In FIG. 2 there is represented a view of the support platen 20 of the picture transport 6. On this support platen lies the picture 7 being scanned. In the first instance, in the previously described manner, a first data capture is carried out so that, for example, the landmarks contained in the picture 7 are established. These signals are then used automatically by digital computation or interactively to fix the scan direction, which is identified in FIG. 2 as item 22. At the same time as the determination of the scan direction, the detector array 9 is rotated by means of a motor 14 via computer 17, so that its detector row lies exactly perpendicular to the direction 22 of scan.

Figure 3:
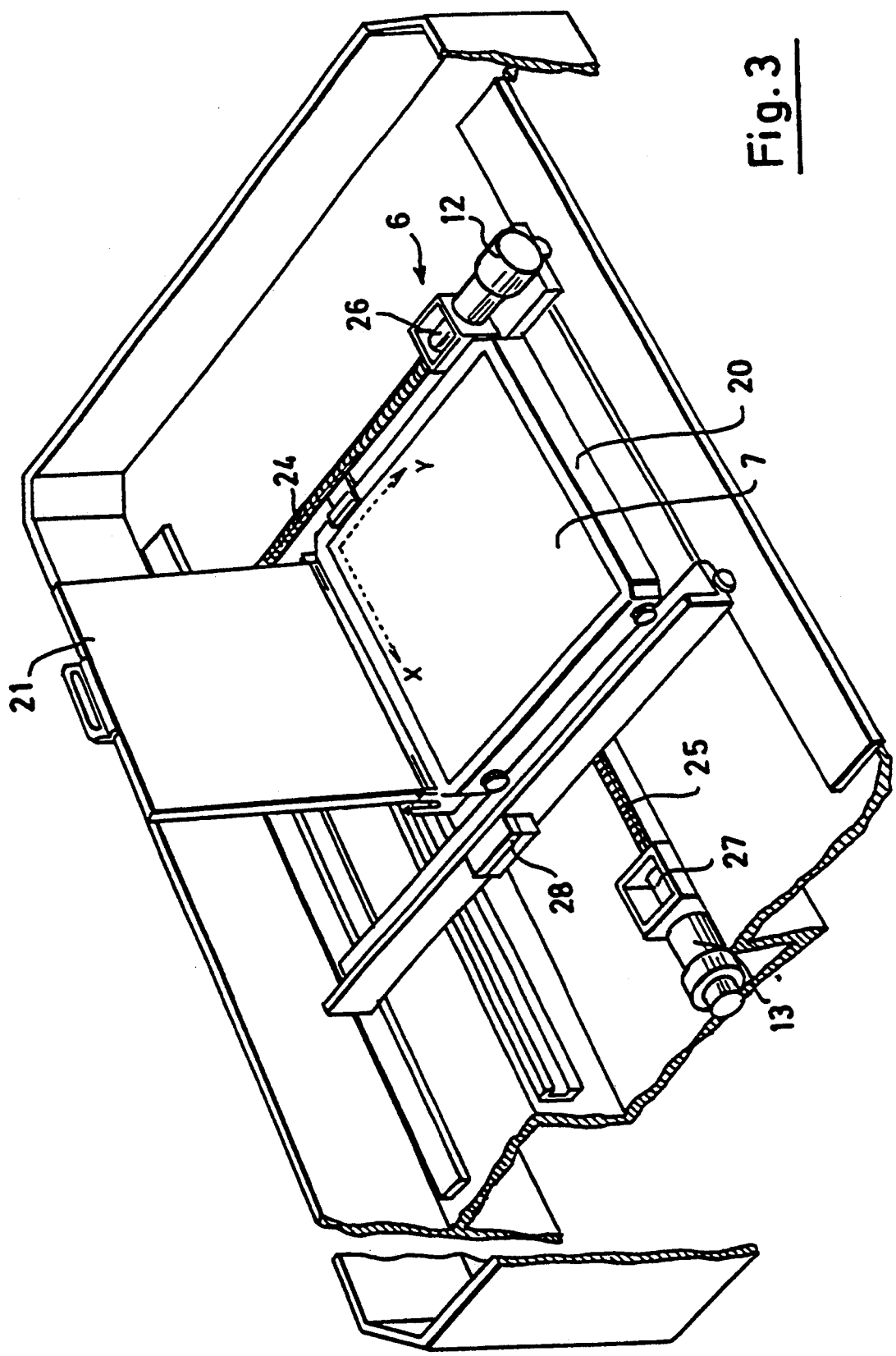
FIG. 3, an exemplary embodiment of an apparatus for movement of the picture transport.

In the case of a succeeding scan run, the picture transport 6 is moved by means of the motors 12 and 13 so that the picture 7 indicated inside of the boundaries in FIG. 2 moves in the scan direction relative to the fixed detector array 9. Then the length of the detector row 9 is encountered as the length of the scanned image is scanned swathwise, so that the breadth of the swath corresponds to the length of the image of the detector array. These swaths are indicated in FIG. 2 by dashed lines. The movement of the picture transport 6 in the scan direction 22 results from operation of both rotation motors 12 and 13 by the computer 17. As FIG. 3 shows, both motors 12 and 13 drive the picture transport over spindles 24 and 25 in two coordinate directions fixed at right angles to one another that are identified as X and Y. Through appropriate operation of the motors 12 and 13, each pre-selected scan direction is precisely tracked.

With each one of the rotation motors 12 and 13 there is contained a position-governing arrangement (26 or 27), with respect to which signals are directed to the computer 17. To this is added a servo loop, which, utilizing feedback of impulses derived from translation along the X- and Y-axes, ensures that the drive of the picture transport 6 follows uniformly and precisely in the pre-selected scan direction.

Outside of the scan field is arranged a calibration field 28, which is to be seen in FIGS. 2 and 3. Before the proper scan run or even after passage of a pre-determined number of picture swaths, the picture transport 6 is moved so that the calibration field 28 is imaged on the detector array 9. This calibration field contains 3 stripes, 28a-28c, with different gray levels. During the calibration run correction factors are obtained which compensate the differential sensitivity of single detector elements and ultimately inequalities of the illumination. The correction factors are stored in the interface 15 as digital values. In the case of proper scan runs, the resultant analog picture signal is converted into a digital signal and multiplied in the interface 15 by the digital correction factors.

The apparatus represented in the FIGS. 1-3 finds especially advantageous application to photographic scanning of aerial photographs, especially stereo aerial photographs. In this case, the negative of the aerial photograph is used directly as the scanned item 7.

What is claimed is:

1. An apparatus for capture of image data from an object, comprising:
    (a) a detector array containing at least one detector row;
    (b) rotation means for rotating the detector array relative to the object;
    (c) scan means for moving the object and the detector array relative to one another in a desired direction of scan;
    (d) means, in communication with the detector array, for using signals generated by the detector array in an initial data capture to determine a desired orientation for the detector array with respect to the object based on the image data in the object; and
    (e) control means, in communication with the rotation means and the scan means, for causing the detector array to be rotated to the desired orientation and for causing the object to be scanned by the detector array in such a way that the at least one detector row is at right angles to the direction of scan;
    whereby orientation of the direction of scan can be determined and achieved solely on the basis of the image data in the object and otherwise independently of its orientation on the apparatus.

2. An apparatus according to claim 1, wherein the scan means includes means for moving the object in two coordinate directions at right angles with respect to one another.

3. An apparatus according to claim 2, further comprising:
    illumination means for illuminating the object;
    wherein the scan means includes a picture transport for holding within a picture area a portion of the object containing the image data being captured, and the picture transport further includes at least one calibration field, disposed outside of the picture area, for calibration of the detector array in relation to the illumination means.

4. An apparatus according to claim 3, further comprising:
    means for calibrating the detector array on a repetitive basis utilizing detector output resulting from scanning the calibration field.

5. An apparatus according to claim 4, wherein the illumination means further includes a plurality of interchangeable filters.

6. A method for capture of graphic data from an object, comprising:
    (a) providing a detector array containing at least one detector row;
    (b) performing an initial capture of graphic data from the object;
    (c) using the signals obtained in the initial capture to establish a desired orientation of the detector array, such that the desired orientation is based on the graphic data in the object;
    (d) rotating the detector array to the desired orientation; and
    (e) moving the object and the detector array relative to one another in a direction of scan such that the at least one detector row is at right angles to the direction of scan.

7. A method according to claim 6, wherein step (e) includes the step of moving the object in two coordinate directions at right angles to one another.

8. A method according to claim 6, further comprising:

(F) calibrating the detector array before commencement of a scan of the object.

9. An method according to claim 8, including the step of repeating (F) after the occurrence of a predetermined number of scans of the object.

10. A method according to claim 8, wherein step (f) includes the step of having the detector array scan a calibration field, the calibration field being disposed outside of a picture area in which the graphic data of the object is located.

11. A method according to claim 6, wherein the object is an aerial photograph.

12. An apparatus for capture of image data from an object comprising:
 (a) a detector array containing at least one detector row for detecting a row of image data on the object;
 (b) scan means for moving the object and the detector array relative to one another to permit the detector array to scan a swath of image data on the object in a desired direction of scan;
 (c) rotation means for rotating the detector array to orient the detected row of image data perpendicular to the desired direction of scan; and
 (d) control means, in communication with the rotation means and the scan means, for operating the scan means to cause the detector array to successively scan contiguous swaths across the object wherein the desired direction of scan is based on the image data in the object and for causing the rotation means to rotate the detector array to orient the detected row of image data perpendicular to the desired direction of scan as defined by the image data.

13. An apparatus of claim 12 wherein the scan means includes means for moving the object in a first coordinate direction and means for moving the object in a second coordinate direction at a right angle to the first coordinate direction.

14. An apparatus of claim 13 further comprising:
 illumination means for illuminating the object;
 wherein the scan means includes a picture transport for holding within a picture area a portion of the object containing the image data being captured, and the picture transport further includes at least one calibration field, disposed outside of the picture area, for calibration of the detector array in relation to the illumination means.

15. An apparatus of claim 14 further comprising:
 means for calibrating the detector array on a repetitive basis utilizing detector output resulting from scanning the calibration field.

16. The apparatus of claim 15 wherein the illumination means further includes a plurality of interchangeable filters.

17. A method for capture of graphic data from an object, comprising:
 (a) providing a detector array containing at least one detector row that detects a row of image data on the object;
 (b) rotating the detector array such that the at least one detector row detects a rotated row of image data that is rotated with respect to the row of image data; and
 (c) moving the object and the detector array relative to one another to cause the detector array to successively scan contiguous swaths across the object, each swath being at a right angle to the rotated row of image data.

18. The method of claim 17 further comprising the steps of performing an initial capture of graphic data from the object and using the signals obtained in the initial data capture to establish a desired orientation of the detector array and wherein step (b) comprises rotating the detector array to the desired orientation.

19. The method of claim 17 wherein step (c) includes moving the object in two coordinate directions at right angles to one another.

20. The method of claim 18 wherein step (c) includes moving the object in two coordinate directions at right angles to one another.

21. The method of claim 17 further comprising calibrating the detector array before commencement of a scan of the object.

22. The method of claim 21 including the step of calibrating the detector array after the occurrence of a predetermined number of scans of the object.

23. The method of claim 21 said step of calibrating includes the step of having the detector array scan a calibration field, the calibration field being disposed outside of a picture area in which the graphic data of the object is located.

24. The method of claim 17 wherein the object is an aerial photograph.

* * * * *